May 26, 1970      R. A. PEABODY      3,514,132

PRESSURE VESSEL CONNECTION

Filed June 10, 1968      2 Sheets-Sheet 1

INVENTOR.
RAYMOND A. PEABODY
BY
*Lyle M Shields*
ATTORNEY

May 26, 1970 R. A. PEABODY 3,514,132

PRESSURE VESSEL CONNECTION

Filed June 10, 1968 2 Sheets-Sheet 2

*INVENTOR.*
RAYMOND A. PEABODY
BY *Lloyd M. Shields*
ATTORNEY

United States Patent Office 3,514,132
Patented May 26, 1970

3,514,132
PRESSURE VESSEL CONNECTION
Raymond A. Peabody, Waterford, Conn., assignor to Perry Oceanographics, Inc., Riviera Beach, Fla., a corporation of Florida
Filed June 10, 1968, Ser. No. 736,938
Int. Cl. F16l *25/00*
U.S. Cl. 285—331   2 Claims

ABSTRACT OF THE DISCLOSURE

A high pressure tank closure and tube connection having the rim of one member formed as a circular clevis with the rim of a second member adapted to seat therein and a resilient seal means loosely disposed inwardly of the juncture point of the two members for sealing the connection in response to hydraulic pressure exerted thereon.

---

The present invention relates to a connecting means for closing large openings in tanks and joining together large cylindrical shells and ducts that are to be subjected to relatively high fluid pressures.

In the development of equipment for use underwater it is essential that such equipment be capable of operating without failure. Many of the structures required for underwater operations are relatively large and often it is desirable to install these large components of equipment within fluid pressure resisting structures for test and operating purposes quickly and with a high degree of safety. Thus a means of providing large access openings in these structures that is ready of operation, economical and that adds a minimum of additional weight is highly desirable.

A large number of pressure vessels have been constructed and used in commercial applications involving extremely high operating pressures that consist of cylindrical shells fitted with various types of end closures. The largest possible access opening that can be provided for access into such a cylindrical shell would be an opening having a diameter equal to the inside diameter of the shell itself. This opening would be the most desirable for installing large objects within the shell. To be feasible such use of shells to make a pressure vessel wherein an object or objects placed therein are subjected to high pressures requires that the large diameter opening provided in the vessel be capable of being closed with a closure means designed to withstand extreme operating pressures without failure and be easy to close and open repeatedly without damage thereto. Quick and easy operation of such a device adds to the safety, efficiency and low cost of the procedure to which it is applied.

Prior connections or couplings designed for such use have been restricted to the conventional bolted flange coupling such as is shown in the Seal Assembly of U.S. Pat. No. 3,207,523 dated Sept. 21, 1965. This type of coupling such as is shown in the Seal Assembly of U.S. too susceptible to distortion at the flange arms due to the magnitude of the flange moment when subject to the internal pressure developed in such structures used as test vessels. Accordingly my objective has been to achieve the function of a bolted pipe flange while overcoming its aforementioned disadvantages.

My invention provides a connection for connecting two cylindrical shells together mechanically while providing a resilient pressure actuated seal so arranged that relatively large gaps between the mechanically connected parts are readily sealed against passage of fluid by being forced into sealed engagement between juxtapositioned areas of said shells. The components of the connection are so disposed as to minimize the stresses within the areas connected when the pressure vessel so formed is subjected to large differential fluid pressures between the inside and outside of said vessel.

SUMMARY OF THE INVENTION

Briefly, the invention comprises a combination mechanical connecting device and fluid pressure seal for joining two cylindrical elements in the form of conduits, or a pressure vessel with an end closure. One cylindrical element terminates at one end in a clevis ring, and the end of the other cylindrical element, or an extension thereof, is designed to be seated in this clevis. Mechanical connecting pins extend through complementary aligned openings in the clevis and seated end of the second cylindrical element, and a sealing cavity is arranged at the entrance end of the clevis between one leg of the latter and the adjacent periphery of the extension of the second cylindrical element. A sealing device, including an annular ring of resilient, compressible material, is inserted in the cavity and is resiliently flowable into any clearances between the periphery of said seated extension and the arm of the clevis.

Accordingly an object of this invention is to provide a high pressure hydraulic coupling for joining together pressure vessels of relatively large dimensions.

Another object is to provide a pressure vessel closure of low initial cost that is efficient and ready of repeated use.

Another object is to provide a connecting means for connecting large pressure vessel parts together that utilizes materials most effectively so as to minimize weight in structures to be operated as part of a submarine vehicle.

Another object is to effect a low cost seal responsive to pressures imposed from opposite directions.

Still another object is to provide an efficient connection for sealing pressure vessels together that is effective over a wide range of tolerances.

Other objects and advantages of this invention will become apparent upon consideration of the following detailed description of the several embodiments thereof, especially when read in conjunction with the accompanying drawings.

Figure 1:
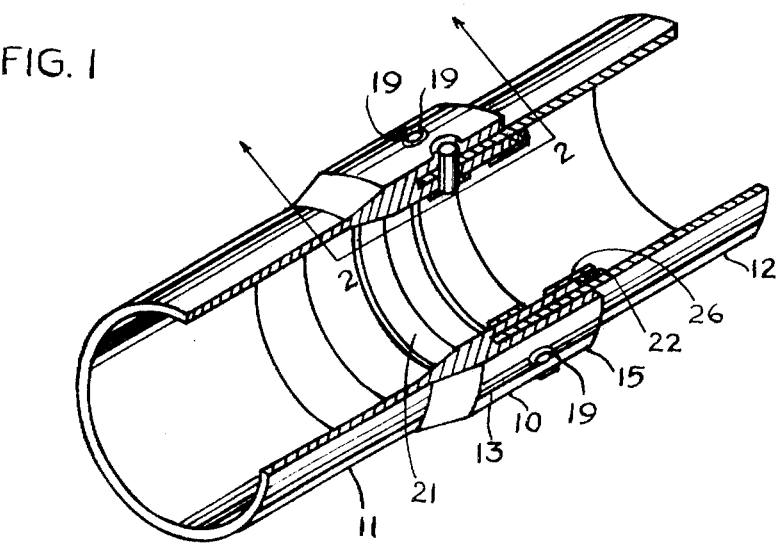
FIG. 1 is a perspective view showing the present invention joining two pressure vessel shells partially fragmentated to show the relationship of the component parts in a preferred embodiment of the invention.
Figure 2:
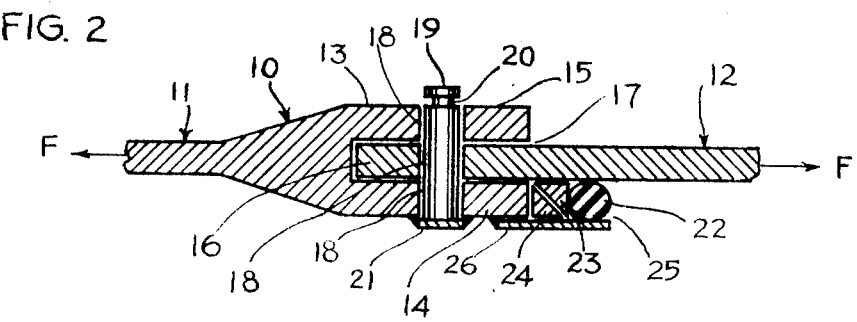
FIG. 2 is an enlarged cross-sectional view taken at 2—2 of FIGS. 1 and 7.

Referring in further detail to the drawings FIGS. 1 and 2 show the coupling of this invention generally designated by the reference numeral 10 in its preferred embodiment as joining together two metal cylindrical shells 11 and 12 to form an elongated pressure vessel having closed ends. The one shell 11 is provided with an enlarged end 13 formed to the shape of a clevis or circular U having a pair of spaced arms 14 and 15 with the outer arm 15 dimensioned to fit over and encircle the end 16 of shell 12. The U groove 17 of the clevis end 13 is of dimensioned to allow the end 16 of shell 12 to fit loosely therein. Matched apertures 18 are formed or drilled in the arms 14 and 15 and the fitted end 16 to receive suitable metal clevis pins 19 snugly fitted therein to effect a mechanical joining of the two shells together. The pins 19 are equally spaced circumferentially of the assembled coupling 10 and mechanically secure it against separation when the pressure vessel is subjected to a fluid pressure load.

The number of clevis pins 19 required to effect a satisfactory mechanical connection is determined by a stress analysis which takes into consideration the type of material being used, the size of the pressure vessel, and the magnitude of the fluid pressure to be applied. To one schooled in the art of structural design analysis it will be evident that the mechanical forces and moments applied to the pressure vessels shells 11 and 12, the clevis 13, and the clevis pins 19 are balanced and minimized by this arrangement of parts. Thus the internal stresses in the materials that constitute the finished product are also minimized and a more effective use of these materials results than would be possible in a bolted flange type connection. Pins 19 are dimensioned to be held in place with a snug fit so as to avoid any tendency to drop out under no-load conditions. To assist in their ready removal pins 19 are usually formed with an undercut groove 20 at their head ends which can also be used to receive a stay wire if desired. A clevis pin seal ring 21 is weld attached to the inner arm 14 of the clevis that covers and seals the inner ends of apertures 18.

Figure 3:
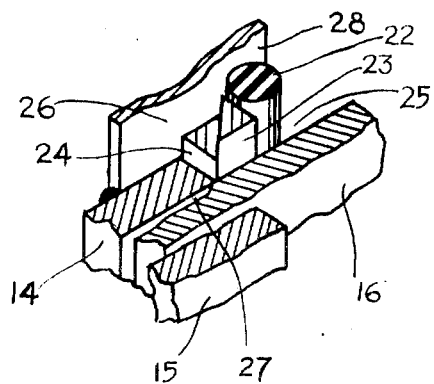
FIG. 3 is an enlarged cross-sectional view of the fluid seal components staggered to better illustrate their relative positions in the connection of FIG. 1.

In order to prevent passage of fluid through the resulting gap 27 between the clevis inner arm 14 and the pressure shell 12 a pressure actuated sealing mechanism is disposed adjacent thereto as best shown in the enlarged views of FIGS. 2 and 3. This seal assembly is comprised of a circular resilient O-ring 22, two soft metal wedge-shaped seal backup rings 23 and 24 dimensioned to fit in the cavity or slot 25 formed between the inner wall of shell 12 and a retainer ring 26 weld attached to inner arm 14 disposed in overlapping relationship therewith. Ring 26 is closely fitted inwardly of arm 14 with one edge 28 extended free from thereof and spaced from end 16 sufficiently to provide a loose fit for rings 23 and 24. The material of O-ring 22 is an elastomer selected as possessing the proper elastic properties and of proper dimensions to be slightly larger in diameter than the circumference of cavity 25. This difference in dimensions in consort with the designed elastic properties of ring 22 provideds a means of preventing fluid passage through the couplying at relatively low fluid pressure and adds to the efficiency of the assemblage. As the fluid pressure is increased the elastic properties of O-ring 22 are such that it will begin to assume fluid properties and have a tendency to be forced through any gap existing between the shell 12 and the clevis 13.

The enlarged view of the coupling shown by FIG. 3 more clearly illustrates the cooperative arrangement of the seal assembly components. It will be noted that the seal backup rings 23 and 24 have triangular cross sections and are assembled in cavity 25 so that the hypotenuse of each is adjacent to that of the other. The dimensions of these parts are such that the two backup rings 23 and 24 together with O-ring 22 just fill the cavity 25 formed by the spacing of retainer ring end 28 from shell 12 by the inner arm 14 of clevis 13. When additional fluid pressure is applied to the O-ring 22 it is forced against the adjacent backup ring 23 which in turn is forced against the sloping surface of the other ring 24 which is confined by the ring 26 and the end of inner arm 14. This action causes the seal backup ring 24 to expand radially filling any gaps between the parts and prevents further flow of O-ring 22 effecting the desired fluid seal of the joined pressure vessels.

FIG. 2 also illustrates graphically the effects of forces F as they act on the pressure vessel shells 11 and 12 when internal pressure is applied. This figure is directed to showing how the arrangement of the clevis 13, the clevis pins 19, and the end wall plate of shell 12 form a mechanical connection. To this assembly the addition of the O-ring 22 as a resilient seal material, the seal backup rings 23 and 24, placed in the cavity 25 formed by the clevis ring 26 spaced from the inner wall of the pressure vessel's shell 12 effect the desired fluid pressure seal. I have found that this coordinated arrangement of the mechanical clevis connection and the pressure actuated sealing element is such that relatively large gaps and clearances between the various parts do not affect the successfull operation of this invention and a fluid seal is always effected. This ability to operate over a wide range of tolerances permits relatively large tolerances in the fabricated parts and relatively large deflections of the parts when under the load to be accommodated, all of which adds up to lower manufacture and operating costs for the device of this invention.

Figure 4:
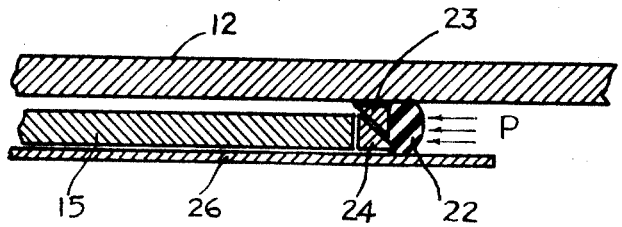
FIG. 4 is an enlarged cross-sectional view of the resilient seal members that illustrates their distorted positions and shapes in effecting a fluid seal by pressure imposed from within the pressure vessel.

FIG. 4 is a cross-sectional view limited to a fluid seal. In this application the seal is placed in the cavity formed by the pressure vessel shell 12, the clevis arm 15, and the seal retainer rings 23 and 24 held in place by ring 26. Fluid pressure P is applied to the seal from inside the vessel in the direction indicated by the arrows and is sufficient to distort it, forcing part of the resilient seals' materials into the spaces that constitute the gaps in clearance between the pressure vessel shell 16 and the clevis arm 15. If the clearance is relatively proportioned and engineered with respect to the durometer elastic properties of the seal material of O-ring 22 and equilibrium between frictional forces and pressure forces is reached, a seal of the vessel is effected.

Figure 5:
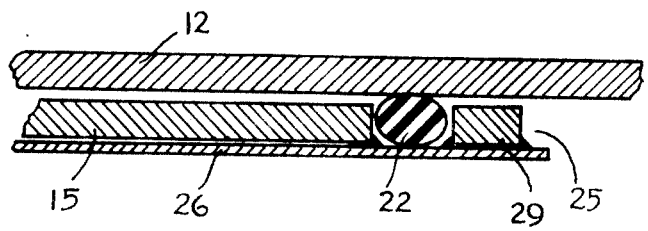
FIG. 5 is an enlarged cross-sectional view of a modified form of the fluid seal.

FIG. 5 is a cross-sectional view of a fluid seal having an auxiliary stop member 29 disposed in the seal cavity on the vessel side of the O-ring seal 22. The stop member 29 is preferably of the same thickness as the clevis yoke arm 15 and is weld attached to the seal retainer ring 26. This arrangement permits fluid pressure to be exerted on either or both sides of the O-ring seal 22 and effects a fluid seal inwardly and outwardly of the pressure vessel.

Figure 6:
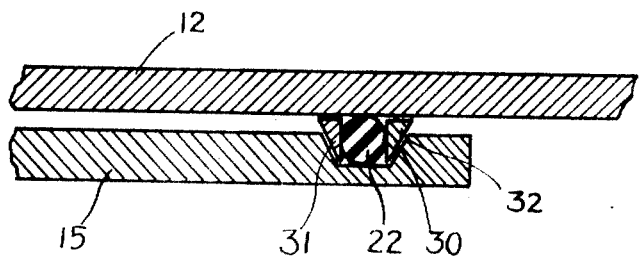
FIG. 6 is an enlarged cross-sectional view of another modified form of the fluid seal and particularly a variation in the mounting of the back-up rings to allow for pressure to be applied from either direction.

In FIG. 6 is shown a modification of the fluid seal portion of this invention wherein the seal cavity is formed as a groove 30 in the clevis arm 15 having opposite sides sloped or inclined to receive mating backup rings 31 and 32 disposed at opposite sides of the O-ring seal 22. This arrangement permits pressures to be applied from either the inside or the outside of the pressure vessel of much higher pressures than would ordinarily be possible with just the O-ring seal.

Figure 7:
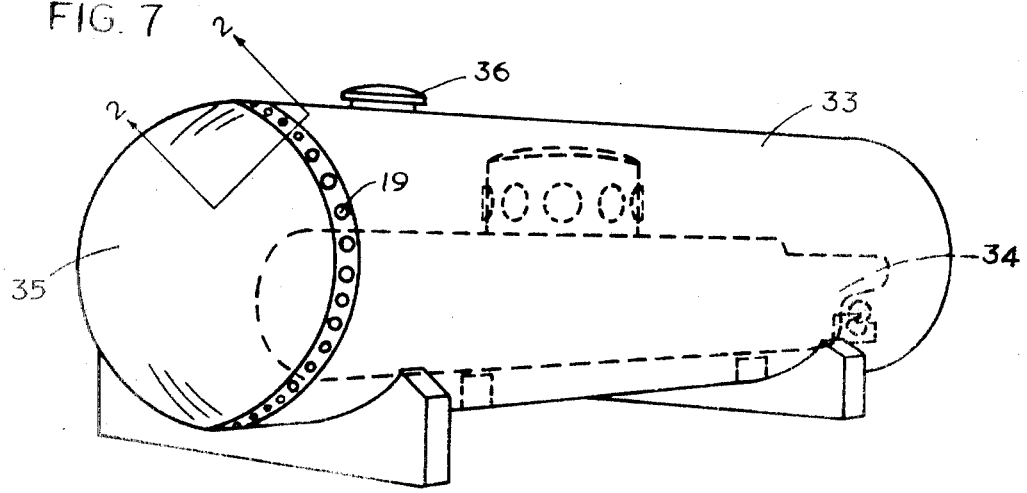
FIG. 7 is a perspective view of a test tank of the type developed for testing submarines and their components having a quickly removable end closure secured in place by the connection of this invention fragmented in FIG. 2 at 2—2.

FIG. 7 illustrates the present invention applied as an effective closure sealing means for a test tank 33 used in testing a submarine 34 shown enclosed therein. This application necessitates that the end closure 35 be capable of sealed closing of an opening greater than the height and width of the assembled submarine that is to be subjected to simulated underwater operating conditions. Additional access to the interior of tank 33, as needed, is provided by a conventional manhole 36 fitted into its top area.

From the above description of the principle of operation of this invention it should be evident to those schooled in the art of pressure vessel design and application that there are many other possible seal arrangements and configuration to which it can be applied. It is pointed out also that the physical location of the sealing element with respect to the mechanical seal is pertinent in attaining the minimum stress levels within the materials of construction realized.

It will be realized also when consideration to the system as a whole is given that the arrangement of the mechanical connection elements and the sealing elements have been located and designed so that clearances and tolerances required in fabrication of these parts and those based on the changes caused by loading of the pressure vessels by the application of fluid pressure do not affect each other as is the situation in a conventional connection of the bolted flange type. The application of the present invention is desirable also in using relatively large pressure vessels where clearances and fabrication tolerances must be kept relatively large for economic reasons.

I claim as my invention:

1. A combination mechanical connecting device and fluid pressure seal for joining two cylindrical elements forming a pressure vessel, comprising a first cylindrical element terminating at one end in an annular clevis ring, a mating annular extension on a second cylindrical element seated in said clevis, a series of radially disposed, mechanical connecting pins extending through complementary aligned openings in said clevis and seated extension, said openings extending completely through said clevis ring, one leg of said clevis being provided with a circular grove spaced from the adjacent periphery of said mating extension, the radial end walls of said groove being formed with outwardly inclined plane surfaces extending toward said mating extension, a seal assembly disposed in said grove having continuous rings of triangular cross-section, with the hypotenuse of each ring matched with one of the inclined end walls of said groove, a circular deformable sealing member disposed between said rings and in sealing engagement with said leg and mating extension and the pin openings in said radial inner leg having means at the radial inner surface of said leg providing a fluid-tight seal across said openings.

2. A combination mechanical connecting device and fluid pressure seal for joining two cylindrical elements forming a pressure vessel, comprising a first cylindrical element terminating at one end in an annular clevis ring, a mating annular extension on a second cylindrical element seated in said clevis, a series of radially disposed, mechanical connecting pins extending through complementary aligned openings in said clevis and seated extension, said openings extending completely through said clevis ring, a sealing cavity at the entrance end of said clevis between the radial inner leg of the latter and the adjacent periphery of the extension of said second cylindrical element, said cavity being formed by a circular band having means sealingly fixing it to the end of said inner leg of said clevis and disposed in radially spaced relation to the adjacent periphery of said mating extension, a sealing device including an annular ring of resilient, compressible material inserted in said cavity and resiliently flowable into any clearances between said periphery of said seated extension and said leg of said clevis, said sealing device also including at least two radially expandable metal rings of triangular cross-section arranged in said sealing cavity, with the hypotenuse of each ring adjacent that of the other and between said resilient sealing ring and the inner extremity of said cavity, and the pin openings in said radial inner leg having means at the radial inner surface of said leg providing a fluid-tight seal across said openings.

References Cited

UNITED STATES PATENTS

| 557,423 | 3/1896 | Outhouse et al. | 285—347 X |
| 1,175,383 | 3/1916 | Shepard | 277—190 |
| 2,961,278 | 11/1960 | Newhall | 277—188 X |
| 3,074,589 | 1/1963 | Chaney | 285—404 X |
| 3,074,591 | 1/1963 | Rover | 220—46 |
| 3,133,753 | 5/1964 | Goodman et al. | 285—331 X |
| 3,246,918 | 4/1966 | Burghart | 285—331 X |
| 3,258,151 | 1/1966 | Gasche | 220—46 |
| 3,357,594 | 12/1967 | Grosh et al. | 285—404 X |

FOREIGN PATENTS 240,505    9/1962    Canada.

DAVE W. AROLA, Primary Examiner

U.S. Cl. X.R.

277—103, 117, 188; 285—286, 347, 404